United States Patent Office 3,462,531
Patented Aug. 19, 1969

3,462,531
USE OF SUBSTITUTED HYDROQUINONES FOR THE MEDICINAL TREATMENT OF INFLAMMATIONS
Roland Jaques, Allschwil, and Pierre-Antoine Desaulles, Muttenz, Switzerland, assignors to Ciba Corporation, New York, N.Y., a corporation of Delaware
No Drawing. Filed Feb. 9, 1967, Ser. No. 614,795
Claims priority, application Switzerland, Feb. 25, 1966, 2,788/66
Int. Cl. A61k 27/00
U.S. Cl. 424—244    5 Claims

ABSTRACT OF THE DISCLOSURE

Use of compounds of the formula

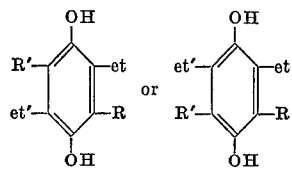

$et$ and $et'$=ethyleneimino radicals, optionally substituted, e.g. by lower alkyl,
R and R'=hydrogen or substituents, such as lower alkoxy, lower alkylmercapto, halogen, and their salts, for the medicinal treatment of inflammations. For example: Use of 2,5-bis-ethyleneimino-hydroquinone.

BACKGROUND OF THE INVENTION

The invention concerns the use of certain organic compounds for the medicinal treatment of inflammations in humans and animals.

Ethyleneimino-hydroquinones are already known as tumor-inhibiting and bactericidal substances, for example from U.S. Patents Nos. 2,770,617 and 2,833,760, Swiss Patents Nos. 334,841 and 334,842 and British Patent No. 818,517.

Nothing has been known of the use of these compounds as antiinflammatory agents.

SUMMARY OF THE INVENTION

It has now been found that certain hydroquinones are valuable in the medicinal treatment of inflammations in humans and animals.

The compounds used are hydroquinones which have ethyleneimino residues in positions 2 and 5, or 2 and 6, and which may optionally be further substituted at the carbon atoms of the ethyleneimino residues and/or of the hydroquinone ring. They may also be used in the form of their salts.

As substituents at the carbon atoms of the ethyleneimino rings there may especially be named lower alkyl residues such as methyl, ethyl, propyl, and isopropyl residues, and straight chain or branched butyl or pentyl residues which may be bonded at any desired position. At the same time, one or more carbon atoms of the ethyleneimino residues may be substituted.

C-substituents in the hydroquinone ring are above all lower alkoxy groups or lower alkylmercapto groups or halogen atoms. One or two C-atoms of the hydroquinone ring may be substituted by these. Lower alkoxy groups or lower alkylmercapto groups are for example those which contain the abovementioned lower alkyl residues, and halogen atoms are above all chlorine or bromine atoms.

Compounds to be especially mentioned are those of formulae

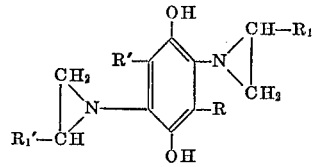

and

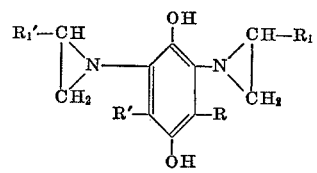

in which R and R' denote lower alkoxy groups or lower alkylmercapto groups, such as especially ethoxy, methylmercapto or ethylmercapto groups, or above all hydrogen atoms, and $R_1$ and $R_1'$ represent lower alkyl residues or hydrogen atoms.

DESCRIPTION OF THE PREFERRED EMBODIMENTS

Of special value as antiinflammatory agents are compounds of formula

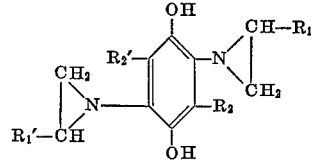

in which $R_1$ and $R_1'$ represent methyl groups or hydrogen atoms and $R_2$ and $R_2'$ represent hydrogen or ethoxy residues or methylmercapto residues.

Of exceptional value is the 2,5-bis-ethyleneimino-hydroquinone of formula

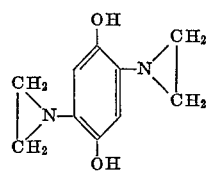

The anti-inflammation effect of these compounds may be demonstrated by experiments with animals.

For example, 2,5-bis-ethyleneimino-hydroquinone in dosages from 10 mg./kg. l.p., 30 mg./kg. s.c. or 100 mg./kg. p.o. administered to rats which have been injected with turpentine in the right pleural cavity, causes a reduction in the amount of exudate compared to the amount of exudate in control animals. For example the amount of exudate in the case of animals treated with 30 mg./kg. i.p. is, after 24 hours, 40% less than in the case of control animals. Where the preparation is administered parenterally the effect 24 hours after application is rather stronger than after 3 hours.

In the case of an inflammation caused by injecting a kaolin suspension into rat paws followed by repeated administration of 2,5-bis-ethyleneimino-hydroquinone the anti-inflammation effect of this substance manifests itself in a reduction in the increase of weight of the paws. The substance already possesses a clear anti-inflammation effect at an initial dosage of 1 mg./kg. i.p. and a total dosage of 2.5 mg./kg. i.p. or at an initial dosage of 3 mg./kg. s.c. and a total dosage of 7.5 mg./kg. s.c. or an initial dosage of 30 mg./kg. p.o. and a total dosage of 75 mg./kg. p.o.

The inflammation-inhibiting effect of 2,5-bis-ethyleneimino-hydroquinone is further evident in an inhibition of foreign body granulome formation rats from dosages of 0.7 mg./kg./day s.c. onwards (maximum effect at 1.0 mg./kg. s.c.).

The acute toxicity ($LD_{50}$) of 2,5-bis-ethyleneimino-hydroquinone is, for example, 150 mg./kg. p.o. and 4 mg./kg. i.p. in the case of rats. If 2,5-bis-ethyleneimino-hydroquinone is chronically administered to rats at a dosage of 30 mg./kg./day p.o., it has a moderate cumulative toxicity.

The hydroquinones used are manufactured in the usual manner, for example in accordance with Swiss patent specifications Nos. 331,051, 340,231, 333,007 and 334,842 and British patent specification No. 818,517, by reacting p-quinone or 2,6-dialkoxy-p-quinone with optionally substituted ethyleneimine or by reduction of appropriately substituted p-quinones.

Amongst the salts of the hydroquinones one uses those with therapeutically usable bases, such as suitable metal hydroxides, for example alkali salts or alkaline earth salts. The resulting salts may be converted into the free compounds.

In view of the close relationship between the compounds in the free form and in the form of their salts, what has been said above and hereinafter with reference to the free compounds refers similarly also to the corresponding salts, wherever this applies.

The hydroquinones are above all used in the form of pharmaceutical preparations for human and veterinary medicine, appropriate for enteral or parenteral administration. Possible excipients are those which do not react with the compounds mentioned, for example water, gelatine, lactose, starch, magnesium stearate, talc, white petroleum jelly, vegetable oils, benzyl alcohols, gums, polyalkylene glycols, cholesterol or other known excipients for medicines. The pharmaceutical preparations may for example be in the form of tablets, dragees, or in the liquid form as solutions, suspensions or emulsions. If desired, they are sterilised and/or contain auxiliary substances such as preservatives, stabilisers, wetting agents, detergents or buffers. They may also additionally contain other therapeutically valuable substances. The preparations are formulated by the usual methods. They contain the active ingredient in, for example, amounts of 10 mg.–30 mg. per dosage unit. The amount of excipient may of course vary over wide limits, but the preparations advantageously contain 2–30% of the active substance. The daily dosage of the active component varies with the illness and is for example 10–100, advantageously 10–60 mg.; it may be given in several doses.

The invention also relates to a process for the medicinal treatment of inflammations which is characterised by administering the substituted hydroquinones referred to, or pharmaceutical preparations containing these.

The compound used in accordance with the invention may inter alia, be administered as tablets as described in the example which follows.

Example

Tablets may for example be prepared in the following composition:

| | Mg. |
|---|---|
| 2,5-bis-ethyleneimino-hydroquinone | 10 |
| Lactose | 40 |
| Tertiary calcium phosphate | 35 |
| Gelatine | 1 |
| Wheat starch | 33 |
| Arrowroot | 15 |
| Magnesium stearate | 0.4 |
| Talc | 5.6 |
| | 140.0 |

The following compounds, used in accordance with the invention may similarly be converted into tablets:
 (a) 2,5-bis-methylethyleneimino-hydroquinone,
 (b) 2,5-bis-(C,C-dimethyl-ethyleneimino)-hydroquinone,
 (c) 3,6-diethoxy-2,5-bis-ethyleneimino-hydroquinone,
 (d) 3,6-bis-methylmercapto-2,5-bis-ethyleneimino-hydroquinone,
 (e) 2,5-bis-ethylmercapto-3,6-bis-ethyleneimino-hydroquinone,
 (f) 3,5-dibromo-2,6-bis-ethyleneimino-hydroquinone,
 (g) 3,5-diethoxy-2,6-bis-ethyleneimino-hydroquinone,
 (h) 3,5-bis-ethylmercapto-2,6-bis-ethyleneimino-hydroquinone,
 (i) 2,5-bis-methylethyleneimino-3,6-diethoxy-hydroquinone,
 (j) 2,5-bis-methylethyleneimino-3,6-bis-methylmercapto-hydroquinone,
 (k) 2,6-bis-ethyleneimino-hydroquinone.

What is claimed is:

1. Process for the medicinal treatment of inflammations in humans and animals characterised by administering to a host having an inflammation, an effective amount of a hydroquinone of the formula

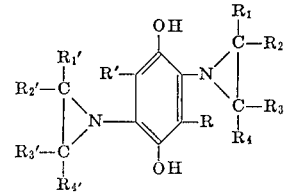

or

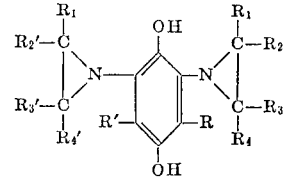

or an alkali or alkaline earth metal salt thereof, in which $R_1$–$R_4$ and $R_1'$–$R_4'$ is each a member selected from the group consisting of hydrogen and lower alkyl and R and R' is each a member selected from the group consisting of hydrogen, lower alkoxy, lower alkylmercapto and halogen.

2. Process as claimed in claim 1, wherein the hydroquinone administered is a member selected from the group consisting of a compound of the formula

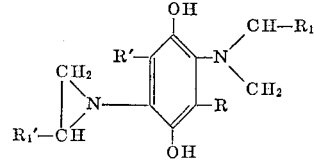

in which R and R' is each a member selected from the group consisting of hydrogen, lower alkoxy and lower alkylmercapto and $R_1$ and $R_1'$ is each a member selected from the group consisting of hydrogen and lower alkyl and an alkali or alkaline earth metal salt thereof.

3. Process as claimed in claim 1, wherein the hydroquinone administered is a member selected from the group consisting of a compound of the formula

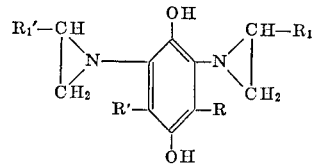

in which R and R' is each a member selected from the group consisting of hydrogen, lower alkoxy and lower alkylmercapto and $R_1$ and $R_1'$ is each a member selected from the group consisting of hydrogen and lower alkyl, and an alkali or alkaline earth metal salt thereof.

4. Process as claimed in claim 1, wherein the hydroquinone administered is a member selected from the group consisting of a compound of the formula

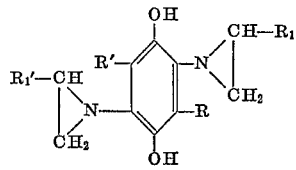

in which R and R' is each a member selected from the group consisting of hydrogen, ethoxy and methylmercapto and $R_1$ and $R_1'$ is each a member selected from the group consisting of hydrogen and methyl, and an alkali or alkaline earth metal salt thereof.

5. Process as claimed in claim 1, wherein the hydroquinone administered is a member selected from the group consisting of the 2,5-bis-ethyleneimino-hydroquinone of the formula

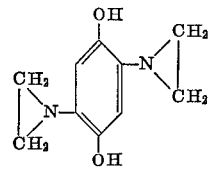

and an alkali or alkaline earth metal salt thereof.

References Cited

UNITED STATES PATENTS 2,770,617 11/1956 Marxer.
2,833,860 5/1958 Marxer.

ALBERT T. MEYERS, Primary Examiner

STANLEY J. FRIEDMAN, Assistant Examiner